3,606,396
UNIVERSAL PIPE GRIPPING UNION
Giordano Prosdocimo, Via Montereale 9, and Giacomo
Brusadin, Via De Paoli 25, both of Pordenone, Italy
Filed Oct. 20, 1969, Ser. No. 867,685
Claims priority, application Italy, Oct. 23, 1968,
60,251-A/68
Int. Cl. F16l 33/00
U.S. Cl. 285—177                    3 Claims

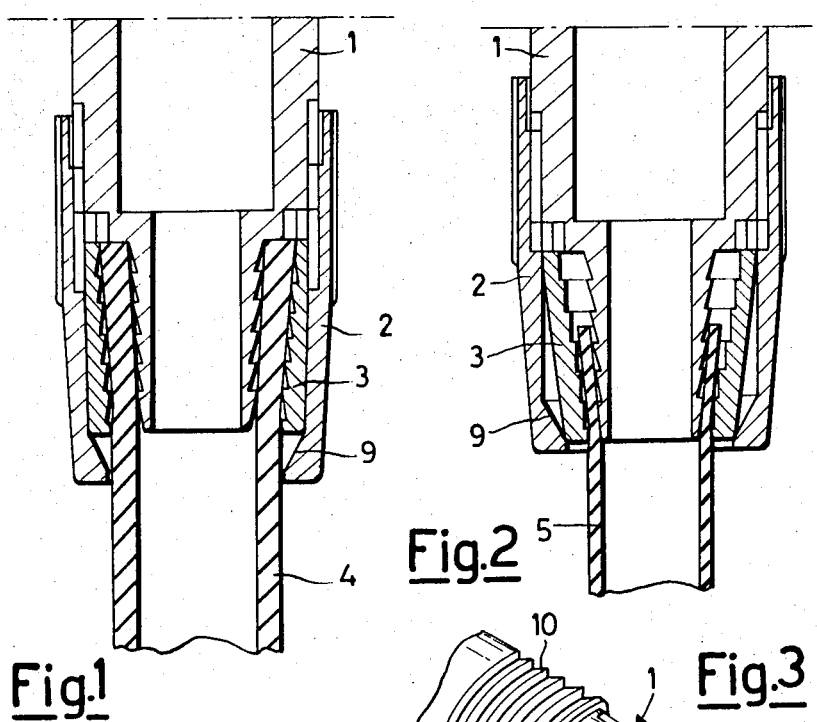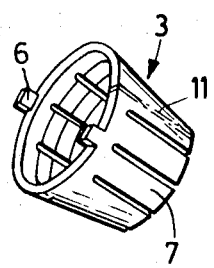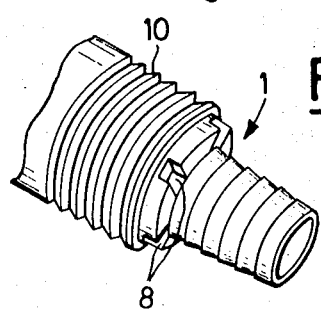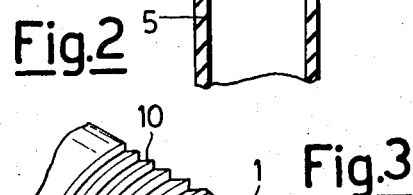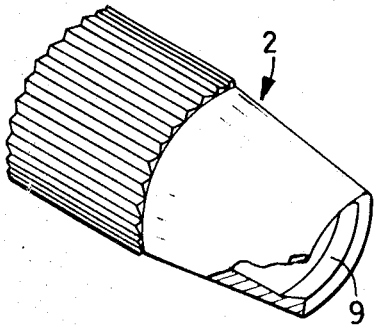

ABSTRACT OF THE DISCLOSURE

Pipe gripping union adapted to be coupled to tubes of various diameter and thickness by a conical indented rubber carrying spigot and a mating elastic tube locking ring.

---

This invention relates to a single union which permits connection to flexible tubes of various thickness and diameter.

Various types of unions exist for connecting flexible tubing, ranging from those with a simple conical rubber carrying ringed spigot to more elaborate ones comprising conical locking nuts threaded on to the main body and others in which the ring nut controls a series of clamps which grip the tube on the internal spigot, etc.

However all these types give rise to various disadvantages, such as the insecure locking of the tube, or more or less secure locking, but only for one size of tube or at the most of sizes only slightly different from the basic size.

The object of this invention is to obviate these disadvantages by permitting coupling of tubes of various diameters and thicknesses. This object is attained by means of a normal conical indented rubber carrying spigot on to which tubes of various internal diameters can be fitted. The tubes are then locked on to this by means of an elastic ring formed from various elastic jaws, indented internally, and which follow a conical layout in the same direction as the rubber carrying spigot.

This ring or rather the group of jaws forming it can expand or contract considerably because of their elasticity.

A further external clamping ring nut, threaded on to the main body, acts with its conical part on the internal elastic ring, pushing the jaws towards the center and thus causing secure locking of the tube on the union.

The invention is described in detail hereinafter with reference to the accompanying drawing which shows by way of example one of the possible embodiments of the device of the invention.

FIG. 1 is a sectional view of the coupling connected to a tube of maximum diameter;

FIG. 2 is a sectional view of the coupling connected to a tube of minimum diameter;

FIG. 3 is a perspective view of the central body of the coupling;

FIG. 4 is a perspective view of the elastic ring; and

FIG. 5 is a perspective view of the clamping ring nut.

The drawing shows the central body 1 of the coupling, the clamping ring nut 2, the elastic ring 3, the tube of maximum diameter 4 and the tube of minimum diameter 5, the notches 8 contained in the central body 1 in which the spigots 6 which fix the elastic ring to the terminal conical part 9 of the clamping ring nut 2 are inserted.

The operation of the device is simple. The clamping ring nut 2 and the elastic ring 3 are fitted on to the tube. The tube is then fitted on to the conical rubber carrying spigot of the central body 1 of the coupling. The ring nut and ring are brought close to the body of the coupling. The spigots 6 of the elastic ring 3 penetrate the notches 8 on the central body to avoid any possibility of rotation of the ring. Finally the clamping ring nut 2 is screwed on the central body 1. If the tube is of maximum diameter the clamping ring nut is screwed up only slightly on the main body 1. Its terminal conical part 9 acts immediately tightening the elastic ring 3 of the tube 4 which thus remains locked between it and the rubber carrying spigot. For tubes of smaller diameter, the clamping ring nut 2 is screwed up to a greater degree on the main body 1 until reaching the minimum diameter in which the terminal conical part of its end portion acts. It is thus in the position shown in FIG. 2 in which the tube 5 of minimum diameter is illustrated.

FIG. 3 shows a perspective view of the main body 1 of the union.

In particular the notches 8 can be seen in numbers of two or more, into which the spigots 6 of the elastic ring 3 lock, thus preventing its rotation during clamping and unclamping, and the threaded part 10 on to which the clamping ring nut 2 is screwed.

FIG. 4 shows a perspective view of the elastic ring 3. It shows the anti-rotational spigots 6 and the tongues 7 formed by axial notches in said ring. In order to further facilitate assembly, especially in the case of tubes of large diameter, it is possible to make said ring still more elastic by means of a notch 11 (shown in dotted lines on the figure) which cuts it totally in the direction of its length.

FIG. 5 shows a perspective view of the clamping ring nut 2. In particular its terminal conical part 9 is conspicuous.

In practice the constructional details may vary without departing from the spirit and scope of the invention.

What we claim is:

1. A universal pipe gripping union comprising a central body including a spigot having a conical outer surface extending the entire length thereof with indented jaws on said outer surface, said spigot being adapted to receive a tubular hose thereon, said central body having at least two notches adjacent said spigot, a conical elastic ring with an internal conical surface extending the entire length thereof and internal indented jaws on said inner surface, said ring including axial projections for engaging in the notches in said body so as to be rotatably secure therewith, said ring being mountable on said hose with said projections engaged in said notches, said ring having longitudinal grooves therein extending from a free end thereof remote from said notches to define longitudinal flexible tongues around the circumference of the ring, and a clamping ring nut on said ring and threadably engaged with said central body, said ring nut including a terminal portion with a conical inner surface facing said tongues at said free end and pressing said tongues inwardly to grip the hose between the indented jaws of the spigot and elastic ring when the ring nut is threadably advanced on said body.

2. A pipe gripping union as claimed in claim 1 wherein said elastic ring is provided with one longitudinal slit extending the entire length thereof.

3. A pipe gripping union as claimed in claim 2 wherein said indented jaws of the spigot and the elastic ring are constituted by helicoidal notches therein.

References Cited

UNITED STATES PATENTS 145,731  12/1873  Edson _____ 285—248X

FOREIGN PATENTS 1,075,106  4/1954  France _____ 285—248

DAVID J. WILLIAMOWSKY, Primary Examiner

D. H. CORBIN, Assistant Examiner

U.S. Cl. X.R.

285—249, 382.7

UNITED STATES PATENT OFFICE
CERTIFICATE OF CORRECTION

Patent No. 3,606,396          Dated September 20, 1971

Inventor(s) Giordano Prosdocimo et al.

It is certified that error appears in the above-identified patent and that said Letters Patent are hereby corrected as shown below:

In the heading to the printed specification, under line 5, insert -- assignor to Univlex S.n.C., Roveredo In Piano (Pordenone, Italy) --.

Signed and sealed this 12th day of September 1972.

(SEAL)
Attest:

EDWARD M. FLETCHER, JR.          ROBERT GOTTSCHALK
Attesting Officer                 Commissioner of Patents

UNITED STATES PATENT OFFICE
CERTIFICATE OF CORRECTION

Patent No. 3,606,396        Dated September 20, 1971

Inventor(s) Giordano Prosdocimo, et. al.

It is certified that error appears in the above-identified patent and that said Letters Patent are hereby corrected as shown below:

In the heading to the printed specification, under line 5, insert -- assignor to Uniflex S.n.C., Roveredo In Piano (Pordenone, Italy) -- .

This certificate supersedes Certificate of Correction issued September 12, 1972.

Signed and sealed this 15th day of May 1973.

(SEAL)
Attest:

EDWARD M.FLETCHER,JR.            ROBERT GOTTSCHALK
Attesting Officer                Commissioner of Patents